United States Patent
Tseng et al.

(10) Patent No.: US 8,194,377 B2
(45) Date of Patent: Jun. 5, 2012

(54) DRIVER AND OVER-CURRENT PROTECTION CIRCUIT THEREIN

(75) Inventors: Kuan-Jen Tseng, Sinshih Township, Tainan County (TW); Ching-Wei Hsueh, Sinshih Township, Tainan County (TW)

(73) Assignee: Himax Analogic, Inc., Tainan County (TW)

( * ) Notice: Subject to any disclaimer, the term of this patent is extended or adjusted under 35 U.S.C. 154(b) by 383 days.

(21) Appl. No.: 12/543,624

(22) Filed: Aug. 19, 2009

(65) Prior Publication Data
US 2011/0043957 A1    Feb. 24, 2011

(51) Int. Cl.
*H02H 3/08* (2006.01)
(52) U.S. Cl. .......................... 361/93.1; 361/93.8; 361/98
(58) Field of Classification Search ................. 361/93.1, 361/93.8, 98
See application file for complete search history.

(56) References Cited

U.S. PATENT DOCUMENTS

| | | | | |
|---|---|---|---|---|
| 4,663,580 A * | 5/1987 | Wortman | ....................... | 320/153 |
| 6,185,082 B1 * | 2/2001 | Yang | ............................... | 361/90 |
| 6,218,816 B1 * | 4/2001 | Fritz et al. | ..................... | 323/277 |
| 6,700,365 B2 * | 3/2004 | Isham et al. | .................. | 323/317 |
| 6,885,531 B2 * | 4/2005 | Tang | ............................ | 361/93.1 |
| 7,304,828 B1 * | 12/2007 | Shvartsman | ................. | 361/93.1 |
| 7,598,818 B2 * | 10/2009 | Bas et al. | ........................ | 331/57 |
| 7,990,078 B2 * | 8/2011 | Petrucci et al. | ............... | 315/309 |

\* cited by examiner

*Primary Examiner* — Patrick Salce
(74) *Attorney, Agent, or Firm* — Thomas, Kayden, Horstemeyer & Risley, LLP

(57) ABSTRACT

An over-current protection circuit includes a voltage generating unit and a comparing unit. The voltage generating unit is configured for receiving a first voltage and generating a reference voltage. The reference voltage has an offset positively dependent on temperature and negatively dependent on the first voltage, and the offset of the reference voltage varies along with another offset varying within a sense voltage sensed by the over-current protection circuit. The comparing unit is configured for comparing the reference voltage with the sense voltage to output a control signal for de-asserting the sense voltage when the sense voltage is correlated to an over-current condition of the sense voltage exceeding the reference voltage. A driver is also disclosed herein.

14 Claims, 2 Drawing Sheets

DRIVER AND OVER-CURRENT PROTECTION CIRCUIT THEREIN

BACKGROUND

1. Technical Field

The present disclosure relates to a protection circuit. More particularly, the present disclosure relates to an over-current protection circuit in a driving device.

2. Description of Related Art

In a conventional driver, an over-current protection circuit is occasionally provided for preventing an over-current condition that a sense voltage, corresponding to an external over-current flowing into the driver, exceeds a reference voltage.

However, the sense voltage may have an offset varying according to variations of temperature or voltage difference, such that the offset within the sense voltage could cause the misoperation of the over-current protection circuit when the sense voltage is compared with the reference voltage.

SUMMARY

In accordance with one embodiment of the present invention, an over-current protection circuit is provided. The over-current protection circuit includes a voltage generating unit and a comparing unit. The voltage generating unit is configured for receiving a first voltage and generating a reference voltage. The reference voltage has an offset positively dependent on temperature and negatively dependent on the first voltage, and the offset of the reference voltage varies along with another offset varying within a sense voltage sensed by the over-current protection circuit. The comparing unit is configured for comparing the reference voltage with the sense voltage to output a control signal for de-asserting the sense voltage when the sense voltage is correlated to an over-current condition of the sense voltage exceeding the reference voltage.

In accordance with another embodiment of the present invention, a driver is provided. The driver includes a sense circuit and an over-current protection circuit. The sense circuit is configured for generating a sense voltage according to an external current flowing into the sense circuit. The sense circuit includes a switch having a turn-on resistance, in which the sense voltage has an offset correlated with the turn-on resistance positively dependent on temperature and negatively dependent on a signal controlling the switch. The over-current protection circuit has a reference voltage therein when operating. The over-current protection circuit is configured for detecting the sense voltage to output a control signal for deactivating the sense circuit when the sense voltage exceeds the reference voltage, indicative of an over-current condition, in which the reference voltage has another offset varying along with the offset within the sense voltage and positively dependent on temperature.

In accordance with yet another embodiment of the present invention, a driver is provided. The driver includes a sense circuit and an over-current protection circuit. The sense circuit is configured for generating a sense voltage according to an external current flowing into the sense circuit. The sense circuit includes a switch having a first turn-on resistance, in which the sense voltage has an offset correlated with the first turn-on resistance positively dependent on temperature and negatively dependent on a signal controlling the switch. The over-current protection circuit includes a voltage generating unit and a comparator. The voltage generating unit is configured for generating a reference voltage. The comparator is configured for comparing the sense voltage and the reference voltage to output a control signal for deactivating the sense circuit when the sense voltage exceeds the reference voltage, indicative of an over-current condition. The reference voltage has another offset varying along with the offset within the sense voltage and positively dependent on temperature.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following detailed description, the embodiments of the present invention have been shown and described. As will be realized, the disclosure is capable of modification in various respects, all without departing from the disclosure. Accordingly, the drawings and description are to be regarded as illustrative in nature, and not restrictive.

Figure 1:
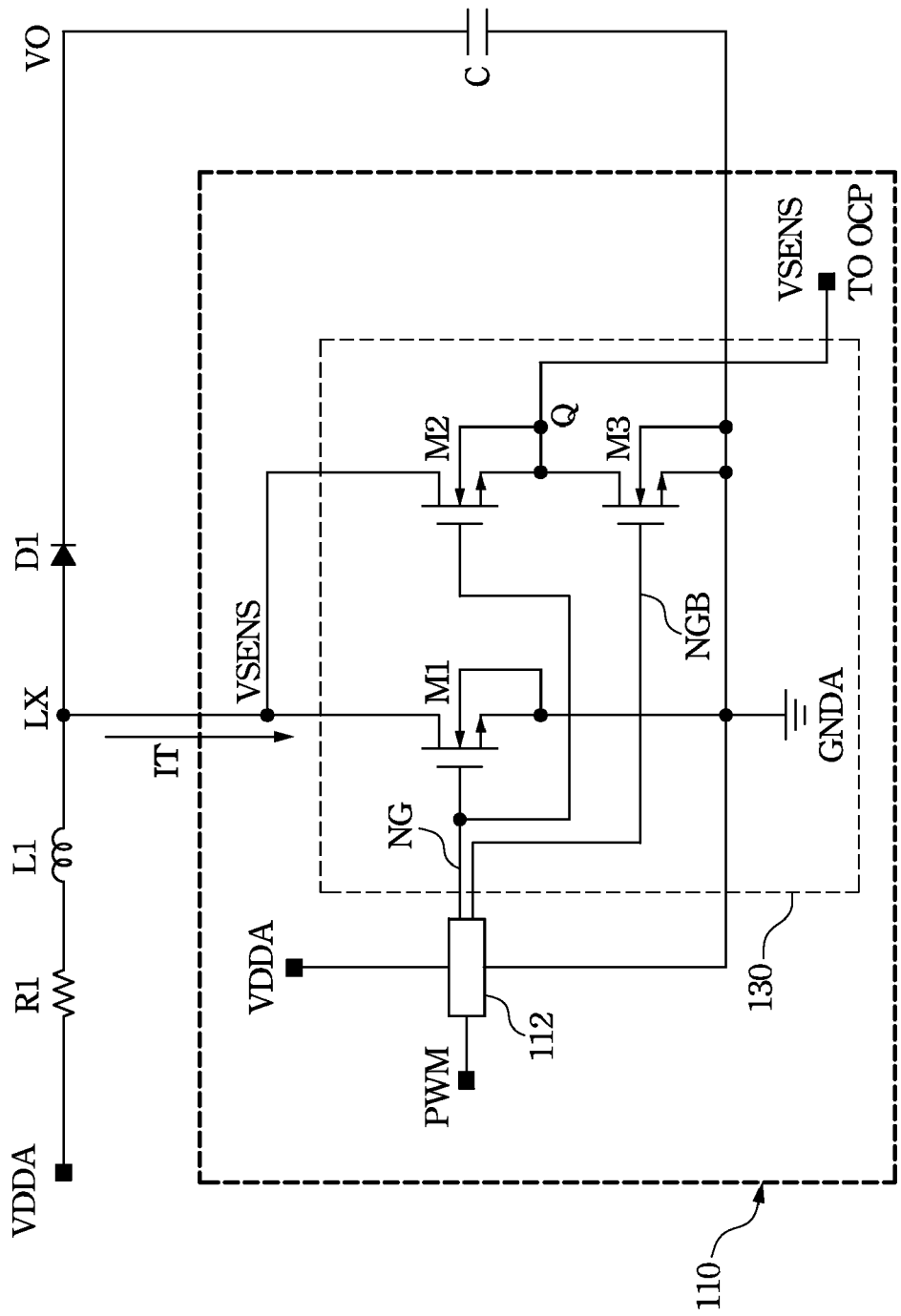
FIG. 1 illustrates a power converter in accordance with one embodiment of the present invention.

FIG. 1 illustrates a power converter in accordance with one embodiment of the present invention. The power converter 100 converts an input voltage VDDA into an output voltage VO for driving loads, e.g. light-emitting diodes (LEDs). The power converter 100 includes a driver 110, and the driver 110 further includes a gate driving circuit 112, a sense circuit 130 and an over-current protection (OCP) circuit (shown in FIG. 2). The gate driving circuit 112 receives a pulse width modulation (PWM) signal to control the sense circuit 130. The sense circuit 130 receives an external current IT flowing into the sense circuit 130 from outside the driver 110, thus generating a sense voltage VSENS according to the current IT, and transmits the sense voltage VSENS to the OCP circuit. Then, the OCP circuit detects the sense voltage VSENS and outputs a control signal for deactivating the gate driving circuit 112 and thus deactivating the sense circuit 130 to de-assert the sense voltage VSENS when the driver 110 is in an over-current condition, so as to protect the driver 110.

The sense circuit 130 further includes NMOS transistors M1, M2 and M3, in which the transistor M1 is much larger than the transistors M2 and M3. The transistors M1 and M2 are both coupled to an output node LX of the driver 110 and controlled by a gate driving signal NG from the gate driving circuit 112. The transistor M3 is coupled to and stacked under the transistor M2 and controlled by a gate driving signal NGB from the gate driving circuit 112, in which the signals NG and NGB have a phase difference of a half duty cycle therebetween and can reach at most a voltage level of VDDA.

In operation, when the signal NG is asserted, the transistors M1 and M2 are turned on. At that moment, the transistor M1 has a turn-on resistance (i.e. $r_{ds,on}$). Once the current IT passes through the transistor M1, the sense voltage VSENS can be generated accordingly. Then, when the signal NGB is asserted, the transistor M3 is turned on to pull down the node Q. Notably, the turn-on resistance of transistor M1 may vary according to variations of the signal NG or temperature; that is, the turn-on resistance of transistor M1 is positively dependent on temperature and negatively dependent on the signal NG. Thus, the sense voltage VSENS would be unstable due to the offset varying along with the signal NG or temperature.

Figure 2:
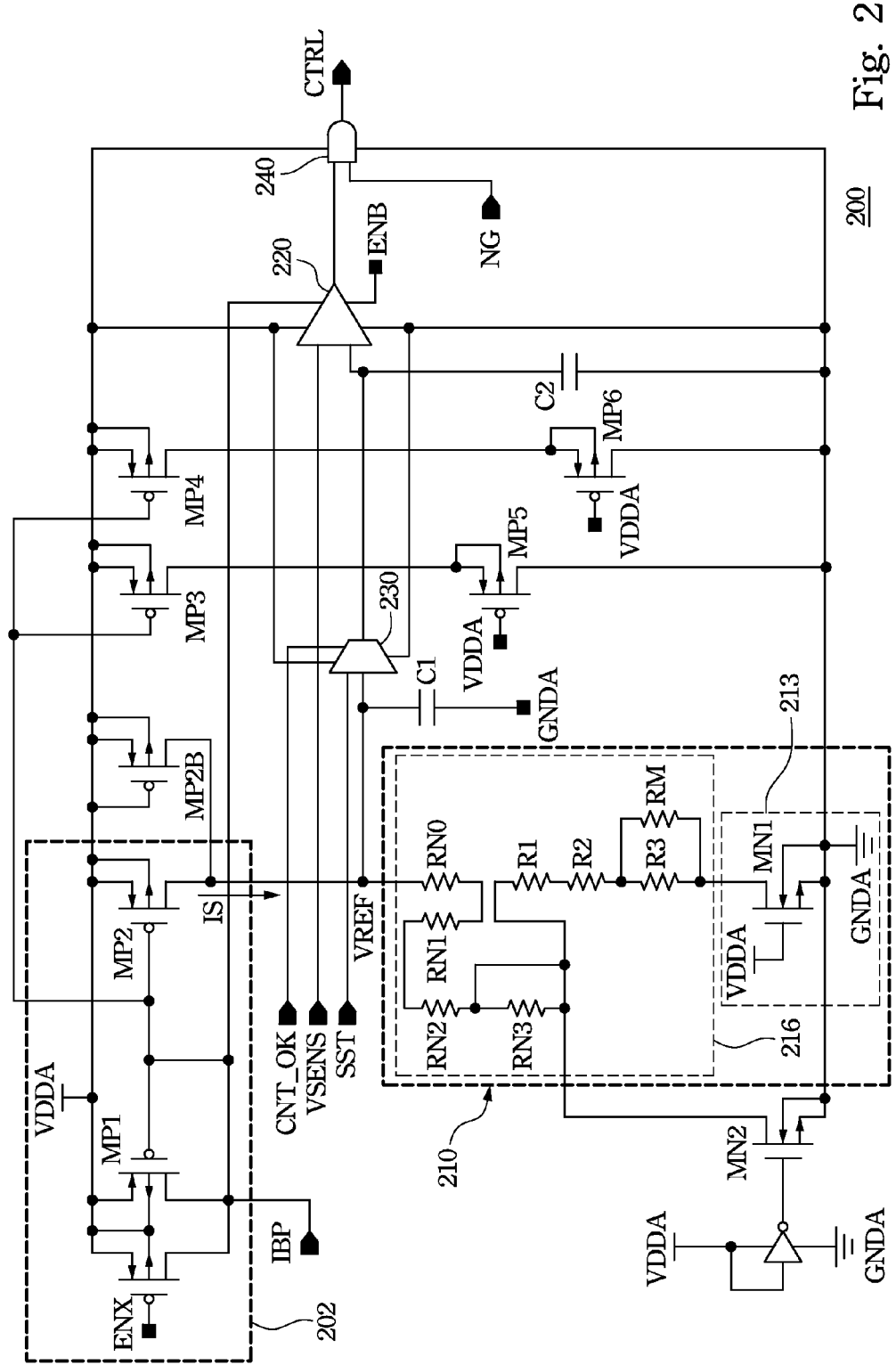
FIG. 2 illustrates an over-current protection (OCP) circuit in accordance with one embodiment of the present invention.

FIG. 2 illustrates an over-current protection (OCP) circuit in accordance with one embodiment of the present invention. The OCP circuit 200 includes a current source 202, a voltage generating unit 210 and a comparator 220, in which the comparator 220 can be implemented by an operational amplifier. The current source 202 provides a current IS for the voltage generating unit 210. The voltage generating unit 210 receives the voltage VDDA and generates a reference voltage VREF according to the current IS, in which the reference voltage VREF has an offset positively dependent on temperature and negatively dependent on the voltage VDDA. The reference voltage VREF may be transmitted through a multiplexer 230 to the comparator 220, then the comparator 220 compares the reference voltage VREF with the sense voltage VSENS to output a control signal CTRL for de-asserting the sense voltage VSENS when the sense voltage VSENS is correlated to the over-current condition that the sense voltage VSENS exceeds the reference voltage VREF.

Moreover, the OCP circuit 200 can further include an AND gate 240 for performing AND logic operation of the control signal CTRL from the comparator 220 and the gate driving signal NG from the gate driving circuit 112, such that the control signal CTRL only can be outputted from the OCP circuit 200 when the signal NG is asserted.

The voltage generating unit 210 further includes a first resistor unit 213 and a second resistor unit 216, in which the second resistor unit 216 is coupled between the first resistor unit 213 and an input of the comparator 220. The first resistor unit 213 and the second resistor unit 216 separately have an effective resistance, such that when the current IS passes through the first resistor unit 213 and the second resistor unit 216, the reference voltage VREF can thus be generated at the input of the comparator 220 according to the current IS.

The first resistor unit 213 receives the voltage VDDA to have a first resistance correlated to the offset within the reference voltage VREF, in which the first resistance is negatively dependent on the voltage VDDA and positively dependent on temperature (i.e. the first resistance increases when temperature increases). The first resistor unit 213 can include a switch coupled to the input of the comparator 220 and controlled by the voltage VDDA to have a turn-on resistance to be the first resistance. In the present embodiment, the switch is an NMOS transistor MN1 having a gate electrode for receiving the voltage VDDA and a source electrode coupled to a ground GNDA. The transistor MN1 has the turn-on resistance (i.e. $r_{ds,on}$) when turned on by the voltage VDDA, and its turn-on resistance is negatively dependent on a voltage difference between the gate electrode and the source electrode (i.e. Vgs) of the transistor MN1 and positively dependent on temperature.

On the other hand, the second resistor unit 216 has a second resistance correlated to the offset within the reference voltage VREF, in which the second resistance is positively dependent on temperature. The second resistor unit 216 can include one or more resistors coupled in parallel or in series to have an effective resistance being the second resistance, in which each of the resistors can be an N-well resistor and has a positive temperature coefficient (i.e. the resistance increases when temperature increases). In one embodiment, the second resistor unit 216 includes one resistor coupled between the drain electrode of the transistor MN1 and the input of the comparator 220 and having a positive temperature coefficient. In the present embodiment, the second resistor unit 216 includes resistors RN0, RN1, RN2, RN3, R1, R2, and R3 coupled in series between the drain electrode of the transistor MN1 and the input of the comparator 220, and the resistors all have a positive temperature coefficient.

The second resistor unit 216 can further include a dummy resistor RM coupled in parallel to the resistor R3, such that the effective resistance of the second resistor unit 216 can be changed by trimming off the resistor RM if necessary.

Since the turn-on resistance of the transistor MN1 in the first resistor unit 213 is negatively dependent on the voltage difference between its gate electrode and source electrode (i.e. Vgs) and positively dependent on temperature and each resistance of the resistors in the second resistor unit 216 increases when the temperature increases, the offset within the reference voltage VREF can thus vary based on the variations of voltage VDDA and temperature.

As a result, even if the sense voltage VSENS has an offset varying along with the signal NG or temperature, the offset within the reference voltage VREF can thus vary along with the offset within the sense voltage VSENS. In other words, the offset within the sense voltage VSENS is compensated by varying the offset within the reference voltage VREF and corresponding to the offset of voltage VSENS. For example, if the sense voltage VSENS increases due to the increase of temperature, then the reference voltage VREF will increase due to the increase of temperature as well; if the sense voltage VSENS decreases due to the signal NG, then the reference voltage VREF will decrease due to the voltage VDDA. Accordingly, the comparator 220 will not mis-operate due to the offset within the sense voltage VSENS.

For the foregoing embodiments, the OCP circuit can be operated normally without concerning the offset caused by the variations of voltage or temperature.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. An over-current protection circuit, comprising:
 a voltage generating unit for receiving a first voltage and generating a reference voltage, wherein the reference voltage has an offset positively dependent on temperature and negatively dependent on the first voltage, and the offset of the reference voltage varies along with another offset varying within a sense voltage sensed by the over-current protection circuit; and
 a comparing unit for comparing the reference voltage with the sense voltage to output a control signal for de-asserting the sense voltage when the sense voltage is correlated to an over-current condition of the sense voltage exceeding the reference voltage;
 wherein the voltage generating unit further comprises:
 a first resistor unit controlled by the first voltage to have a first resistance, the first resistance being negatively dependent on the first voltage and correlated to the offset within the reference voltage; and
 a second resistor unit coupled between the first resistor unit and an input of the comparing unit, the second resistor unit having a second resistance, the second resistance being positively dependent on temperature and correlated to the offset within the reference voltage.

2. The over-current protection circuit as claimed in claim 1, wherein the first resistor unit further comprises:

a switch controlled by the first voltage to have a turn-on resistance as the first resistance.

3. The over-current protection circuit as claimed in claim 1, wherein the second resistor unit further comprises:
a resistor having a positive temperature coefficient.

4. The over-current protection circuit as claimed in claim 1, wherein the second resistor unit further comprises:
a plurality of resistors coupled in parallel or series to have an effective resistance being the second resistance, each of the resistors having a positive temperature coefficient.

5. The over-current protection circuit as claimed in claim 1, wherein the voltage generating unit further comprises:
an NMOS transistor having a gate electrode for receiving the first voltage, a drain electrode, and a source electrode for receiving a second voltage, wherein a turn-on resistance of the NMOS transistor is negatively dependent on a voltage difference between the gate electrode and the source electrode; and
a plurality of resistors coupled in series to the drain electrode of the NMOS transistor, each of the resistors having a positive temperature coefficient.

6. A driver, comprising:
a sense circuit for generating a sense voltage according to an external current flowing into the sense circuit, the sense circuit comprising a first switch having a turn-on resistance, wherein the sense voltage has an offset correlated with the turn-on resistance positively dependent on temperature and negatively dependent on a signal controlling the switch; and
an over-current protection circuit having a reference voltage therein when operating, the over-current protection circuit configured for detecting the sense voltage to output a control signal for deactivating the sense circuit when the sense voltage exceeds the reference voltage, indicative of an over-current condition, wherein the reference voltage has another offset varying along with the offset within the sense voltage and positively dependent on temperature, wherein the over-current protection circuit comprises:
a first resistor unit for receiving a first voltage to have a first resistance negatively dependent on the first voltage and positively dependent on temperature, the first resistance being correlated to the offset within the reference voltage;
a comparator having a first input and a second input, the first input configured for receiving the sense voltage; and
a second resistor unit coupled between the first resistor unit and the second input of the comparator, wherein the second resistor unit has a second resistance positively dependent on temperature and correlated to the offset within the reference voltage.

7. The driver as claimed in claim 6, wherein the first resistor unit further comprises:
a second switch controlled by the first voltage to have a turn-on resistance as the first resistance.

8. The driver as claimed in claim 7, wherein the second switch is an NMOS transistor having a gate electrode for receiving the first voltage and a source electrode coupled to a ground.

9. The driver as claimed in claim 7, wherein the second input of the comparator is coupled to the second switch.

10. The driver as claimed in claim 9, wherein the second resistor unit further comprises:
a resistor coupled between the second switch and the second input of the comparator and having a positive temperature coefficient.

11. The driver as claimed in claim 9, wherein the second resistor unit further comprises:
a plurality of resistors coupled in series between the second switch and the second input of the comparator, each of the resistors having a positive temperature coefficient.

12. A driver, comprising:
a sense circuit for generating a sense voltage according to an external current flowing into the sense circuit, the sense circuit comprising a first switch having a first turn-on resistance, wherein the sense voltage has an offset correlated to the first turn-on resistance positively dependent on temperature and negatively dependent on a signal controlling the switch; and
an over-current protection circuit comprising:
a voltage generating unit for generating a reference voltage; and
a comparator for comparing the sense voltage and the reference voltage to output a control signal for deactivating the sense circuit when the sense voltage exceeds the reference voltage, indicative of an over-current condition;
wherein the reference voltage has another offset varying along with the offset within the sense voltage and positively dependent on temperature;
wherein the voltage generating unit further comprises:
a second switch coupled to an input of the comparator and controlled by a first voltage to have a second turn-on resistance negatively dependent on the first voltage and positively dependent on temperature, the second turn-on resistance being correlated to the offset within the reference voltage; and
a resistor coupled between the second switch and the input of the comparator, the resistor having a resistance positively dependent on temperature and correlated to the offset within the reference voltage.

13. The driver as claimed in claim 12, wherein the second switch is an NMOS transistor having a drain electrode coupled to the input of the comparator, a gate electrode for receiving the first voltage, and a source electrode coupled to a ground.

14. The driver as claimed in claim 12, wherein the voltage generating unit further comprises:
a plurality of resistors coupled in series between the second switch and the input of the comparator, each of the resistors having a positive temperature coefficient.

* * * * *